Feb. 9, 1926.  1,572,554
C. E. MILNER
COUPLING OR CONNECTING DEVICE FOR LUBRICATING
APPARATUS AND FOR LIKE PURPOSES
Filed Feb. 1, 1924
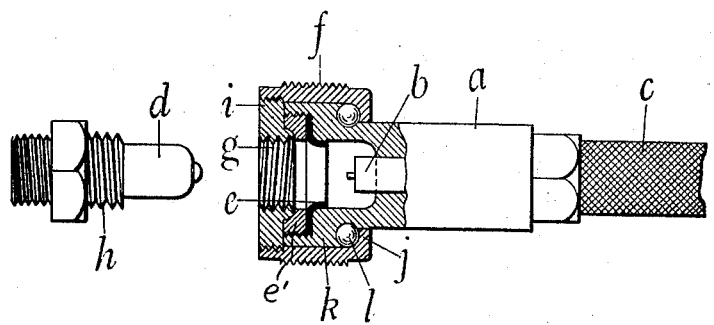
Inventor
C. E. Milner
By Marks & Clerk
Attys.

Patented Feb. 9, 1926.

1,572,554

UNITED STATES PATENT OFFICE.

CHARLES ERIC MILNER, OF BIRMINGHAM, ENGLAND, ASSIGNOR TO BENTON & STONE LIMITED, OF BIRMINGHAM, ENGLAND.

COUPLING OR CONNECTING DEVICE FOR LUBRICATING APPARATUS AND FOR LIKE PURPOSES.

Application filed February 1, 1924. Serial No. 690,027.

*To all whom it may concern:*

Be it known that I, CHARLES ERIC MILNER, a British subject, residing at Bracebridge Street, in the city of Birmingham, England, have invented certain new and useful Improvements Relating to Coupling or Connecting Devices for Lubricating Apparatus and for like Purposes, of which the following is a specification.

The invention relates primarily to lubricating apparatus of the kind known as grease guns in which a cylindrical receptacle containing grease and means for ejecting the grease is provided with a screwed coupling for detachable connection with a nipple on the part which receives the grease. The invention is however applicable to other like uses.

Ordinarily the coupling is connected to the grease container by a strong flexible pipe, though sometimes it is attached directly to the grease gun. In either case it is necessary for the coupling to be rotatable relatively to the container to enable it to be attached to or detached from the fixed nipple. When, as is usual, the rotatability is provided at the junction of the coupling with the pipe of grease container, difficulty is usually encountered in preventing escape of grease at that part, and the necessity for a greast tight joint inevitably results in diminishing the freedom of rotation of the coupling.

By the present invention the difficulty is overcome in a very simple manner.

The invention comprises the provision on the coupling of a freely rotatable screwed head for connection with the nipple, or the like.

The invention also comprises the provision of a ball or roller bearing between the head and the body of the coupling.

The accompanying drawing illustrates one manner of carrying the invention into effect.

The body $a$ of the coupling is provided with an internal valve $b$ as heretofore, and at one end is rigidly secured by a grease tight joint with a pipe $c$ or the body of the grease container. The other end, which slips over the nipple $d$ on the part which receives the lubricant, is preferably fitted with an internal gasket or cup leather $e$ held in position by a jamb nut $e'$ for making a grease tight joint between the coupling and the nipple. The outer surface of the jamb nut preferably lies flush with the adjacent edges of the body $a$. On the forward end of the coupling a freely rotatable head $f$ is provided, and in its front face is arranged an internally screwed aperture $g$ adapted to cooperate with the externally threaded portion $h$ of the nipple. Preferably the said aperture is provided in a disc $i$ screwed into the head and thereby secured. The inner face of the disc abuts the jamb nut $e'$ and the adjacent edge of the coupling body $a$ while the outer face of the disc $i$ lies flush with the outer edge of the head.

A flange $j$ at the rear side of the head abuts against one face of a collar $k$ on the body, the cooperation of these parts, together with the abutment of the aforesaid disc $i$ against the front of the body, secures the head against endwise movement.

Preferably there is arranged between the rear flange of the head and the collar on the body a ring of balls $l$ and so ensure free rotatability of the head on the body.

By means of this invention the operation of attaching the coupling to the nipple before bringing the grease gun into action is greatly facilitated, while the joint is rendered leak proof by arranging the cup leather $e$ within the body so that it coacts with the smooth outer surface of the nipple $d$ when he latter is attached to the head.

Having thus described my invention what I claim as new and desire to secure by Letters Patent is:—

In a coupling device for use with a grease gun and nipple in combination a cylindrical body part, a valve mounted therein, a collar integral with one end of the body part and having the inner surface enlarged to provide a shoulder, a nipple engaging gasket on the shoulder, an annular jamb nut for holding the gasket in position and lying flush with the forward end of the collar, a freely rotatable head mounted externally on said collar, an inward flange at the rear of said head, an annular disc secured to the forward end of the head and provided with a threaded opening for detachable engagement with the nipple, and the head being held against axial movement by the interaction of the flange and disc with the ends of the collar and the body.

In testimony whereof I have signed my name to this specification.

CHARLES ERIC MILNER.